(12) United States Patent
Park et al.

(10) Patent No.: US 9,799,254 B2
(45) Date of Patent: Oct. 24, 2017

(54) DISPLAY APPARATUS AND METHOD OF DRIVING THE SAME

(71) Applicant: SAMSUNG DISPLAY CO., LTD., Yongin-si, Gyeonggi-do (KR)

(72) Inventors: Chanyoung Park, Yongin-si (KR); Se Woong Kang, Seoul (KR); Sang Jin Kim, Seoul (KR); Kyung Ah Park, Seoul (KR); Ilnam Kim, Yongin-si (KR); Wonsang Park, Yongin-si (KR); Hongshik Shim, Yongin-si (KR)

(73) Assignees: SAMSUNG DISPLAY CO., LTD., Yongin-si, Gyeonggi-Do (KR); SAMSUNG LIFE PUBLIC WELFARE FOUNDATION, Seoul (KR)

( * ) Notice: Subject to any disclaimer, the term of this patent is extended or adjusted under 35 U.S.C. 154(b) by 23 days.

(21) Appl. No.: 14/945,132

(22) Filed: Nov. 18, 2015

(65) Prior Publication Data

US 2016/0365017 A1    Dec. 15, 2016

(30) Foreign Application Priority Data

Jun. 12, 2015 (KR) .................. 10-2015-0083663

(51) Int. Cl.
| | |
|---|---|
| G09G 5/02 | (2006.01) |
| G09G 3/20 | (2006.01) |
| G06F 3/048 | (2013.01) |
| H04N 9/64 | (2006.01) |
| G06F 3/0484 | (2013.01) |
| G06F 3/0488 | (2013.01) |

(52) U.S. Cl.
CPC ......... *G09G 3/2003* (2013.01); *G06F 3/0488* (2013.01); *G06F 3/04847* (2013.01)

(58) Field of Classification Search
CPC combination set(s) only.
See application file for complete search history.

(56) References Cited

U.S. PATENT DOCUMENTS

| | | | |
|---|---|---|---|
| 2005/0105796 A1* | 5/2005 | Hong | ............... G06T 11/001 |
| | | | 382/162 |
| 2005/0134800 A1 | 6/2005 | Kim | |
| 2006/0061586 A1* | 3/2006 | Brulle-Drews | ......... A61B 3/066 |
| | | | 345/594 |

(Continued)

FOREIGN PATENT DOCUMENTS

| | | |
|---|---|---|
| JP | 2009-071541 | 4/2009 |
| JP | 2009-077218 | 4/2009 |

(Continued)

*Primary Examiner* — Wesner Sajous
(74) *Attorney, Agent, or Firm* — F. Chau & Associates, LLC

(57) ABSTRACT

A method of driving a display device includes displaying both a natural image and a color vision test image on the display unit. The color vision test image is an image used to determine whether a person has a color vision impairment. A color adjustment user interface for adjusting color of the display unit is displayed on the display unit. A color adjustment instruction that instructs to adjust color of the display unit is received via an input unit. Supply image data supplied to the display unit is adjusted based on the color adjustment instruction by using a controller.

18 Claims, 10 Drawing Sheets

(56) References Cited

U.S. PATENT DOCUMENTS

| | | | |
|---|---|---|---|
| 2006/0256127 A1 | 11/2006 | Cho et al. | |
| 2007/0009113 A1* | 1/2007 | Kenoyer | H04L 29/06027 |
| | | | 381/122 |
| 2007/0236656 A1 | 10/2007 | Jeong et al. | |
| 2008/0003547 A1* | 1/2008 | Woolfe | G06F 17/3025 |
| | | | 434/98 |
| 2009/0135266 A1* | 5/2009 | Raaymakers | A61B 3/066 |
| | | | 348/222.1 |
| 2013/0328792 A1* | 12/2013 | Myers | G06F 1/1652 |
| | | | 345/173 |
| 2014/0015850 A1 | 1/2014 | Ahn et al. | |
| 2016/0255941 A1* | 9/2016 | Yang | A45D 42/10 |
| 2016/0270656 A1* | 9/2016 | Samec | A61B 3/085 |

FOREIGN PATENT DOCUMENTS

| | | |
|---|---|---|
| JP | 2011-182006 | 9/2011 |
| KR | 1020050077209 | 8/2005 |
| KR | 1020050106299 | 11/2005 |
| KR | 1020060079404 | 7/2006 |
| KR | 20060116511 | 11/2006 |
| KR | 1020070036434 | 4/2007 |
| KR | 20070084278 | 8/2007 |
| KR | 20070099969 | 10/2007 |
| KR | 1020110020592 | 3/2011 |
| KR | 20140008977 | 1/2014 |
| KR | 1020140100200 | 8/2014 |
| KR | 1020150009852 | 1/2015 |

* cited by examiner (a) (b)

(c) (d)

(a)

(b)

(c)

(a)

(b)

(c)

(d)

DISPLAY APPARATUS AND METHOD OF DRIVING THE SAME

CROSS-REFERENCE TO RELATED APPLICATION

This application claims the benefit of Korean Patent Application No. 10-2015-0083663, filed on Jun. 12, 2015, in the Korean Intellectual Property Office, the disclosure of which is incorporated by reference herein in its entirety.

TECHNICAL FIELD

The present disclosure relate to a display apparatus, and more particularly, to a display apparatus and a method of driving the same.

DISCUSSION OF THE RELATED ART

Display devices, such as those used in televisions, smartphones, and personal computers (PCs), are electronic devices capable of displaying an image to a user. These images are often in color, and accordingly, the display device has the ability to display various colors to the user. However, some users may have limited or no ability to see colors. A person with a limited or no ability to see color may be referred to either as "colorblind" or "color vision deficient." Color vision deficient people may not be able to recognize certain images being displayed on display devices, as recognition of these images may depend on the ability of the user to differentiate between two or more different colors.

SUMMARY

One or more exemplary embodiments of the present invention may include a display device and a method of driving the display device that may adjust color of a display unit depending on whether a user color vision deficient and a degree to which the user is color vision deficient while the user views an image used to test for color vision deficiency.

One or more exemplary embodiments of the present invention may include a display device and a method of driving the same, that may adjust color of a display unit depending on whether a user has deficient color vision and a degree to which the user has deficient color vision while the user simultaneously views a natural image obtained by a method of capturing an image, etc. and a defective color vision test image.

One or more exemplary embodiments of the present invention may include a display device and a method of driving the same that may adjust color of at least one of a color vision deficiency test image and a natural image in real-time in response to relevant adjustment in the case where a user adjusts color of a display unit.

One or more exemplary embodiments of the present invention may include a display device and a method of driving the same, that may replace one of a color vision deficiency test image and a natural image with another image whenever the display device is driven or whenever a user so-intends.

Additional aspects will be set forth in part in the description which follows and, in part, will be apparent from the description, or may be learned by practice of the presented exemplary embodiments of the present invention.

According to one or more exemplary embodiments of the present invention may, a method of driving a display device, implemented by the display device including a display unit includes displaying a natural image and a color vision deficiency test image on the display unit. A color adjustment user interface for adjusting color of the display unit is displayed on the display unit. A color adjustment instruction that instructs to adjust color of the display unit via an input unit is received. Supply image data supplied to the display unit is adjusted based on the color adjustment instruction by using a controller.

The method may further include, after receiving the color adjustment instruction, moving at least a portion of the color adjustment user interface based on the color adjustment instruction by using the display unit.

The displaying of the images may include displaying the natural image and the test image on one screen, and the displaying of the color adjustment user interface may include displaying the color adjustment user interface on one screen together with the natural image and the test image.

The method may further include, after the displaying of the images, receiving an image switching instruction that instructs to switch at least one of the natural image and the test image to another image via the input unit and switching the at least one of the natural image and the test image to another image based on the image switching instruction by using the display unit. The displaying of the images may include displaying at least one image switching user interface at a position corresponding to the at least one of the natural image and the test image.

The method may further include receiving input image data from an external source via a communication unit. The adjusting may include adjusting the input image data based on the color adjustment instruction to generate the supply image data.

The adjusting may include adjusting red, green, blue (RGB) values of the input image data based on the color adjustment instruction to generate corrected RGB values, and generating the supply image data by using the corrected RGB values as components.

The adjusting may include selecting one gray scale curve based on the color adjustment instruction among a plurality of gray scale curves, determining a data signal corresponding to the supply image data based on the selected gray scale curve, and supplying the determined data signal to a light-emitting device included in the display unit.

The color adjustment user interface may include a color adjustment cursor, and the moving may include moving the color adjustment cursor based on the color adjustment instruction.

The adjusting may include adjusting a correction degree of the supply image data in proportion to a distance by which the color adjustment cursor moves from an initial position to a moved position.

The displaying of the images may include replacing the at least one of the natural image and the test image with a new image according to a predetermined probability whenever the display device is driven.

The displaying of the images may include a first image display operation of displaying the test image and a second image display operation of displaying the natural image. The displaying of the color adjustment user interface may include a first interface display operation of, when the test image is displayed, displaying a user interface via which a type of color vision deficiency of a user is determined and a second interface display operation of, when the natural image is displayed, displaying the color adjustment user interface.

The second interface display operation may include determining a kind of color to display on the color adjustment user interface based on a kind of color vision deficiency the user is determined to have, in the first interface display operation. The adjusting may include determining a kind of color to adjust according to the color adjustment instruction based on the kind of color vision deficiency the user is determined to have, in the first interface display operation.

The test image may include an Ishihara test image, a color wheel where predetermined color or arbitrary colors are arranged, a color code where predetermined color or arbitrary colors are arranged, and/or a mosaic pattern image where predetermined color or arbitrary colors are arranged.

According to one or more exemplary embodiments of the present invention, a method implemented by a display device including a touch sensitive display unit includes using a controller included in the display device to display a natural image and a color vision deficiency test image on the touch sensitive display unit. A color adjustment user interface for adjusting color of the touch sensitive display unit is displayed on the touch sensitive display unit. A contact on the touch sensitive display unit is detected. When the detected contact corresponds to a predetermined gesture, supply image data supplied to the touch sensitive display unit is adjusted based on the detected contact.

The displaying of the images may include displaying the natural image and the test image on one screen. The displaying of the color adjustment user interface may include displaying the color adjustment user interface on one screen together with the natural image and the test image.

The method may further include receiving input image data from an external source via a communication unit included in the display device. The adjusting may include adjusting red, green, blue (RGB) values of the input image data based on the detected contact to generate corrected RGB values, and generating the supply image data by using the corrected RGB values as components.

The color adjustment user interface may include a color adjustment cursor. The moving may include moving the color adjustment cursor based on the detected contact. The adjusting may include adjusting a correction degree of the supply image data in proportion to a distance by which the color adjustment cursor moves from an initial position to a moved position.

According to one or more exemplary embodiments of the present invention, a display device includes a display unit for displaying a natural image. A color vision deficiency test image is displayed. A color adjustment user interface for adjusting color is also displayed. An input unit receives a color adjustment instruction that instructs to adjust color of the display unit. A controller adjusts supply image data supplied to the display unit based on the color adjustment instruction.

The input unit may include a capacitance change sensor, a storage change sensor, and/or a light amount change sensor that detects a touch input. The color adjustment instruction may be a touch input for the input unit that corresponds to a gesture determined in advance.

Exemplary embodiments of the present invention may provide a display device and a method of driving the same that may adjust color of a display unit depending on whether a user has a color vision deficiency and a degree to which the user has a color vision deficiency while the user views a color vision deficiency test image.

Also, exemplary embodiments of the present invention may provide a display device and a method of driving the same that may adjust color of a display unit depending on whether a user has a color vision deficiency and a degree to which the user has the color vision deficiency while the user simultaneously views a natural image obtained by a method of capturing, etc. and a defective color vision test image.

Also, exemplary embodiments of the present invention may provide a display device and a method of driving the same, that may adjust color of at least one of a color vision deficiency test image and a natural image in real-time in response to relevant adjustment in the case where a user adjusts color of a display unit.

Also, exemplary embodiments of the present invention may provide a display device and a method of driving the same, that may replace one of a color vision deficiency test image and a natural image with another image whenever the display device is driven or whenever a user intends.

BRIEF DESCRIPTION OF THE DRAWINGS

These and/or other aspects will become apparent and more readily appreciated from the following description of the exemplary embodiments of the present invention, taken in conjunction with the accompanying drawings in which.

DETAILED DESCRIPTION

Figure 1:
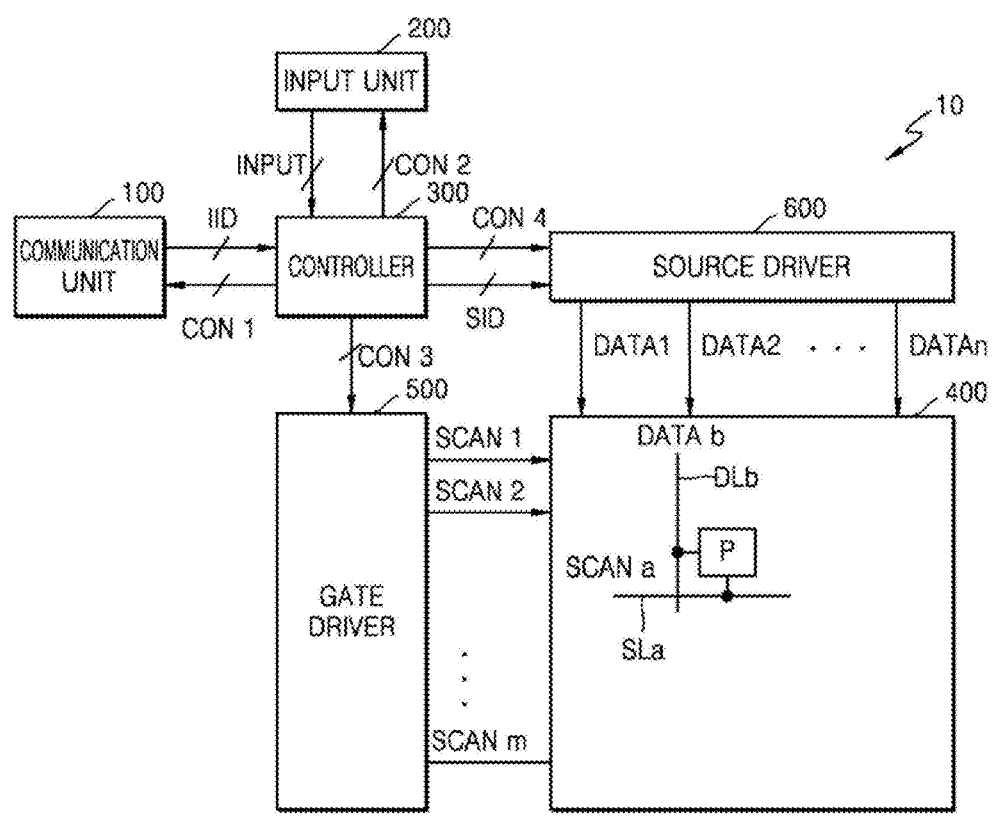
FIG. 1 is a block diagram illustrating a display device according to an exemplary embodiment of the present invention.

As the inventive concept allows for various changes from what is described herein and numerous embodiments beyond those that are shown, exemplary embodiments of the present invention will be illustrated in the drawings and described in detail in the written description. However, the inventive concept is not limited to exemplary embodiments of the present invention described below and may be implemented in various forms. It will be understood that although the terms "first", "second", etc. may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements in the drawings may be exaggerated for convenience of explanation.

Hereinafter, exemplary embodiments of the present invention are described in detail with reference to the accompanying drawings. Like reference numerals may be used for like or corresponding elements when description is made with reference to the drawings, and repeated description thereof may be omitted.

FIG. 1 is a block diagram illustrating a display device according to an exemplary embodiment of the present invention.

Referring to FIG. 1, a display device 10 according to an exemplary embodiment of the present invention may include a communication unit 100, an input unit 200, a controller 300, a display unit 400, a gate driver 500, and a source driver 600. At least some of the communication unit 100, the input unit 200, the controller 300, the gate driver 500, and the source driver 600 may be formed in separate semiconductor chips, respectively, and integrated in one semiconductor chip. Also, at least some of the communication unit 100, the input unit 200, the controller 300, the gate driver 500, and the source driver 600 may be formed on a substrate where the display unit 400 is formed.

The display device 10 may display an image using a plurality of pixels. The display device 10 itself may be, for example, an electronic device such as a smartphone, a tablet personal computer (PC), a notebook PC, a monitor, a television (TV), etc., and may be a part for displaying an image of relevant electronic devices. Specifically, the display device 10 may include a smart TV, a mobile phone, a personal digital assistant (PDA), a media player, a micro server, a global positioning system (GPS) device or other navigation device, an electronic book reader device, a digital broadcasting terminal, a kiosk, an MP3 player, a digital camera, a wearable electronic device, and other mobile or non-mobile computing devices. However, the display device 10 is not limited thereto. Furthermore, the display device 10 may have a communication function and a data processing function, and may include accessories such as a watch, glasses, a hair band, a ring, etc. including a display unit that may display an image. However, the display device 10 is not limited thereto.

A pixel P may include a plurality of sub-pixels that display a plurality of primary colors, respectively, in order to display various colors. In the present specification, a pixel P may represent one sub-pixel. However, the disclosure is not limited thereto, and a pixel P may mean one unit pixel including a plurality of sub-pixels. For example, where it is described in the present specification that there is one pixel P, it may also be understood that there may be one sub-pixel, and also that there may be a plurality of sub-pixels forming one unit pixel.

A pixel P may include a light-emitting device and a pixel circuit. A driving voltage and a data signal may be applied to the pixel circuit, and the pixel circuit may output a driving current to the light-emitting device. The light-emitting device may emit light that is proportional to the magnitude of the driving current.

The communication unit 100 may receive an electronic signal from an external electronic device via a wired/wireless network. The communication unit 100 may receive a plurality of image frames from external electronic devices via the wired/wireless network. The plurality of image frames may be image frames that are to be sequentially displayed to produce a moving image. Each of the image frames may include input image data (IID). The IID may include information regarding the luminance of light emitted via a pixel P, and the number of bits of the IID may be determined based on the luminance. For example, if the luminance of light emitted via a pixel P are 256 steps, the IID may be an 8-bit digital signal. The communication unit 100 may output IID received from a source external to the controller 300.

The communication unit 100 may be a Bluetooth communication unit, a Bluetooth low energy (BLE) communication unit, a near field communication (NFC) unit, a Wi-Fi communication unit, a ZigBee communication unit, an infrared data association (IrDA) communication unit, a Wi-Fi direct (WFD) communication unit, an ultra wideband (UWB) communication unit, an Ant+ communication unit, etc. but the specification is not limited thereto.

The input unit 200 may receive an instruction from a user of the display device 10. For example, the input unit 200 may receive from the user a color adjustment instruction for adjusting color of the display unit 400. The input unit 200 may receive the user's instruction in various forms. For example, the input unit 200 may receive a user's voice input, a user's character input, or a user's touch input. Also, the input unit 200 may receive a wired or wireless communication signal via a remote controller, but the invention is not limited thereto.

To perform this instruction receiving function, the input unit 200 may include a button or a switch on one region of the display device 10. Also, the input unit 200 may include a detector for receiving a wired or wireless communication signal from an external source. Also, the input unit 200 may include a touch detector for detecting a touch input by the user. Furthermore, the input unit 200 may further include a keyboard, a mouse, a keypad, a dome switch, a touchpad (e.g., a contact capacitance-type touchpad, a pressure resistive layer-type touchpad, an infrared detect-type touchpad, a surface ultrasonic conductive-type touchpad, an integral tension measurement-type touchpad, a piezo effect-type touchpad, etc.), a jog wheel, a jog switch, etc., but the disclosure is not limited thereto.

The controller 300 may control an overall operation of the display device 10. For example, the controller 300 may control relevant elements to perform an intended operation by outputting a first control signal CON1, a second control signal CON2, a third control signal CON3, and a fourth control signal CON4 to the communication unit 100, the input unit 200, the gate driver 500, and the source driver 600, respectively. Though not shown, the controller 300 may output a control signal for sending instructions directly to the display unit 400.

According to an exemplary embodiment of the present invention, the controller 300 may output a control signal via a communication path connected with the display unit 400, the gate driver 500, and the source driver 600 via a wire line or wirelessly. The controller 300 may receive IID from the communication unit 100, and output a first control signal CON1 to the communication unit 100. The controller 300 may receive user inputs INPUT from the input unit 200, and output a second control signal CON2 to the input unit 200. The controller 300 may output a third control signal CON3 to the gate driver 500. The third control signal CON3 may include a horizontal synchronization signal HSYNC.

The controller 300 may output supply image data (SID) and a fourth control signal CON4 to the source driver 600. The fourth control signal CON4 may include control signals which the source driver 600 requires in order to output data signals DATA1, DATA2, . . . , DATAn ("DATA1 to DATAn"), where "n" is an integer greater than 2, corresponding to the SID to the display unit 400. The SID may include image information required for generating data signals DATA1 to DATAn. The SID may be image data generated by correcting IID received from an external source.

In this case, the controller 300 may generate the SID supplied to the display unit 400 from the IID. In this case, the controller 300 may adjust the SID based on a color adjustment instruction, received from a user, that adjusts the color of the display unit 400.

Specifically, the controller 300 may generate corrected red, green, blue (RGB) values by adjusting RGB values of the IID. In this case, the controller 300 may generate the corrected RGB values by using a 3×3 matrix. In this case, the matrix may be an inverse matrix of a Daltonized matrix. Also, the controller 300 may determine coefficient values of a relevant Daltonized matrix based on a color adjustment instruction received from a user of the display device 10. After that, the controller 300 may generate SID by using the generated corrected RGB values as components.

The controller 300 may include a memory that stores a plurality of gray scale curves. The controller 300 may select one gray scale curve among a plurality of stored gray scale curves based on a user's color adjustment instruction. The controller 300 may determine a data signal corresponding to SID based on the selected gray scale curve. The controller 300 may control the source driver 600 to supply the determined data signal to a pixel P of the display unit 400. In this case, the source driver 600 may perform an operation of determining the data signal corresponding to the SID, and supplying the relevant data signal to the pixel P of the display unit 400.

The display unit 400 may display an image. The display unit 400 may include a liquid crystal display, a thin film transistor-liquid crystal display, an organic light-emitting diode, a flexible display, a 3D display, and/or an electrophoretic display, but the present disclosure is not limited thereto.

The display unit 400 may include a plurality of pixels, a plurality of scan lines each being connected to a row of pixels, and a plurality of data lines each being connected to a column pixels. For example, as illustrated in FIG. 1, the display unit 400 may include a pixel P included in a plurality of pixels. In this case, the pixel P may be at an "a"-th row and a "b"-th column of the display unit 400. In this case, the display unit 400 may include an "a"-th scan line SLa connected to all pixels located in an "a"-th row, and include a "b"-th data line DLb connected to all pixels located in a "b"-th column. In this case, the "a"-th scan line SLa and the "b"-th data line DLb may be connected with the pixel P.

The display unit 400 may display a color vision deficiency test image. A color deficiency test image, as used herein, is an image that is used to test whether a person has a color vision deficiency (referred to herein as "impairment"). Also, the display unit 400 may display a natural image obtained by capturing an actual scene, etc. In this case, the natural image may include an image obtained by capturing an actual landscape, a sculpture, etc., an image including a computer graphic effect, or an illustrated image, etc. Also, the display unit 400 may display a color adjustment user interface for representing an adjustment degree of color of an image displayed on the display unit 400. Detailed descriptions of a method of displaying, at the display unit 400, the test image, the natural image, and the color adjustment user interface are provided below with reference to FIGS. 3 to 8.

The gate driver 500 may output scan signals SCAN1 to SCANm to scan lines. The gate driver 500 may output the scan signals SCAN1 to SCANm in synchronization with a vertical synchronization signal.

The source driver 600 may output data signals DATA1 to DATAn to data lines in synchronization with the scan signals SCAN1 to SCANm. The source driver 600 may output the data signals DATA1 to DATAn that are in proportion to received image data to the data lines.

Figure 2:
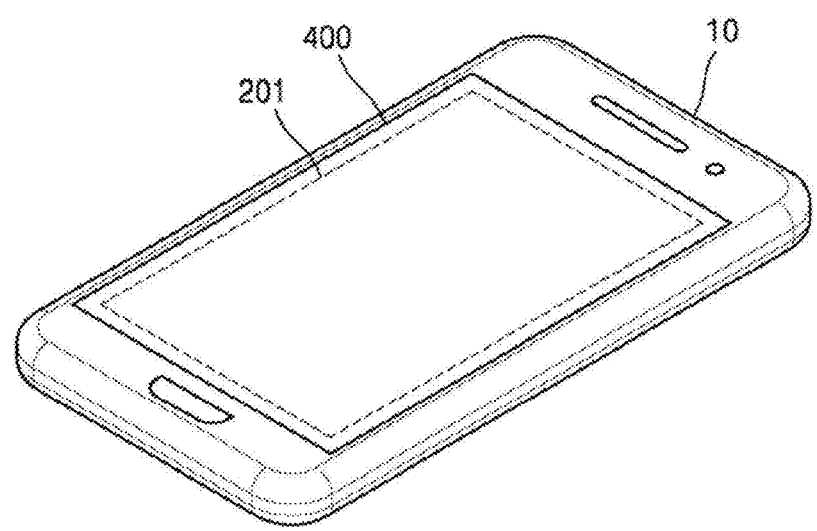
FIG. 2 is a schematic diagram illustrating a smartphone as the display device according to an exemplary embodiment of the present invention.

FIG. 2 is a schematic diagram illustrating a smartphone as the display device 10 according to an exemplary embodiment of the present invention.

Referring to FIG. 2, the display device 10 according to the exemplary embodiment of the present invention may be a smartphone. In this case, the input unit 200 (FIG. 1) may include a touch detector 201. Also, the relevant touch detector 201 may be incorporated into a touch screen by forming a layer structure with the display unit 400. In this case, the touch detector 201 and the display unit 400 may be incorporated as a single structure. In this case, the relevant single structure may be called a touch sensitive display unit.

Hereinafter, an exemplary embodiment of the present invention is described for the case where the display device 10 is a smartphone, and the display unit 400 is configured as a touch sensitive display unit.

FIGS. 3 to 8 are schematic diagrams illustrating an example where a display device is driven according to an exemplary embodiment of the present invention.

Figure 3:
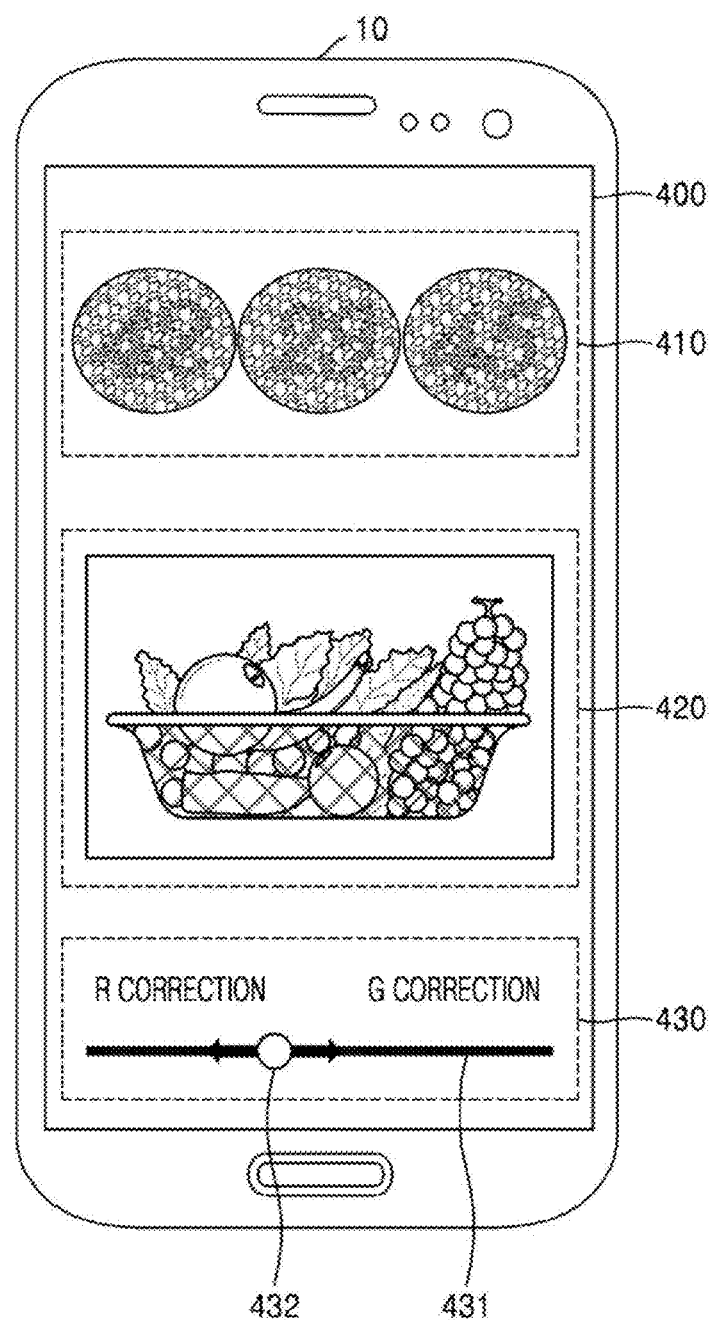
FIGS. 3 to 8 are schematic diagrams illustrating an example where a display device is driven according to an exemplary embodiment of the present invention.
Figure 4:
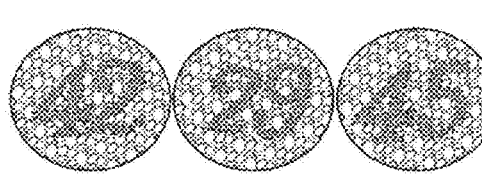
Figure 4:
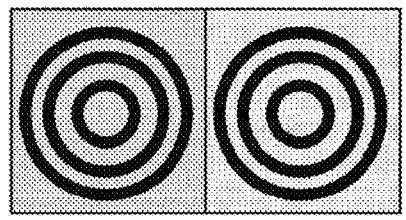
Figure 4:
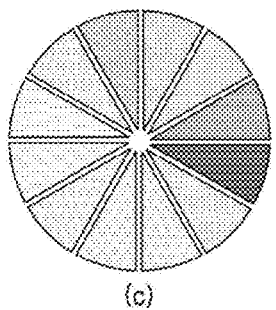
Figure 4:
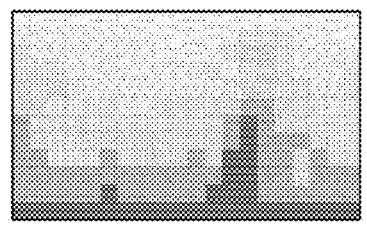
Figure 5:
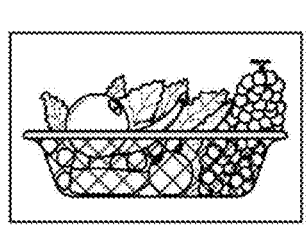
Figure 5:
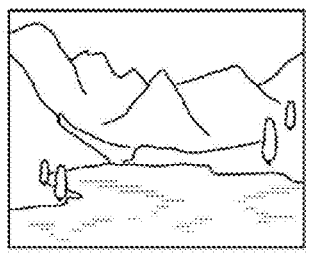
Figure 5:
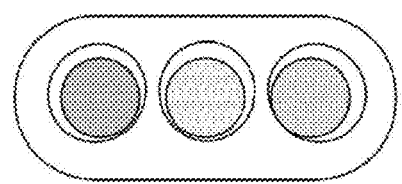

Referring to FIG. 3, the display unit 400 of the display device 10 according to an exemplary embodiment of the present invention may display a color vision deficiency test image 410, a natural image 420, and a color adjustment user interface 430.

The display unit 400 may display the color vision deficiency test image 410. The color vision deficiency test image 410 may be an image used to test whether a user has a color vision deficiency. For example, the color vision deficiency test image 410 may be an image representing specific information. In this case, the color vision deficiency test image 410 may be an image produced such that a person with normal color vision may see the relevant specific information from within the color vision deficiency test image. However, the color vision deficiency test image 410 may be an image that a user with a color vision deficiency cannot see the specific information may not see the specific information properly.

For example, the color vision deficiency test image 410 may be an Ishihara image including a plurality of red-based circles having different sizes and a plurality of green-based circles having different sizes. For example, the red-based circles included in the defective color vision test image 410 may be arranged in a shape representing numbers such as 42, 29, or 45, and green-based circles may be arranged in a shape enclosing the red-based circles. In this case, the display unit 400 may simultaneously display a plurality of Ishihara test images, and colors of the red-based circles and the green-based circles included in the plurality of ishihara test images may be different from each other. For example, the display unit 400 may be used to determine a degree to which a user has a color vision impairment by appearing differently to users having various degrees of color vision deficiency. Accordingly, the display unit 400 may provide an image that allows a user to determine not only whether the user has a color vision deficiency but also to determine a degree to which the user has a color vision deficiency.

The color vision deficiency test image 410 may be another image besides the Ishihara test image. For example, referring to FIG. 4, the color vision deficiency test image 410 displayed on the display unit 400 may be one or more of various kinds of images.

The color vision deficiency test image 410 may be the Ishihara test image as illustrated in FIG. 4A.

Also, the color vision deficiency test image 410 may be a color discrimination ability test image as illustrated in FIG. 4B. In this case, the color discrimination ability test image may include black color, and further include two colors for testing a color discrimination ability. For example, the color discrimination ability test image may display green-based color on one side, and display red-based color on the opposite side, but the present disclosure is not limited thereto.

Also, the color vision deficiency test image 410 may be a color wheel as illustrated in FIG. 4C. In this case, colors set by the display device 10 may be arranged on the color wheel, and/or colors designated in advance by a user may be arranged on the color wheel.

Also, the color vision deficiency test image 410 may be a color code or a mosaic pattern image as illustrated in FIG. 4D. In this case, colors set by the display device 10 may be arranged on the color code or the mosaic pattern image, and/or colors designated in advance by a user may be arranged on the color code or the mosaic pattern image. The display unit 400 may display one of various kinds of images as the color vision deficiency test image 410 according to the user's selection or as set in advance. Alternatively, the display unit 400 may simultaneously display two or more various kinds of images as the color vision deficiency test image 410.

Referring to FIG. 3 again, the display unit 400 may display the natural image 420. The natural image 420 may include an image obtained by capturing an image of an actual landscape, a sculpture, etc., an image including a computer graphic effect, or an illustrated image, etc.

For example, the natural image 420 may be various kinds of images which a user may encounter in everyday life. Specifically, the natural image 420 may be an image where objects of different colors are arranged. In this case, the objects of different colors may be various kinds of fruits or vegetables, sculptures, stationeries, electronic or mechanical tools, etc. but the disclosure is not limited thereto.

Meanwhile, the natural image 420 may be another image besides an image where objects of different colors are arranged. For example, referring to FIG. 5, the natural image 420 displayed on the display unit 400 may be various kinds of images.

The natural image 420 may be an image where objects of different colors are arranged as illustrated in FIG. 5A.

Also, the natural image 420 may be an image obtained by capturing an actual landscape or a building, etc. as illustrated in FIG. 5B. In this case, the image obtained by capturing the actual landscape or the building, etc. may be an image including two or more colors. For example, an image obtained by capturing the actual landscape or a building, etc. may be an image where a blue-colored lake and sky, a green-colored tree, and a mountain that has red-colored elements, such as autumn leave, are displayed, but the specification is not limited thereto.

Also, the natural image 420 may be an image where traffic lights are displayed as illustrated in FIG. 5C. For example, the natural image 420 may be an image including images that are likely to be encountered in real life, and may be an image where accurate color discrimination is important to safety, etc. The display unit 400 may display one of various kinds of images as the natural image 420 according to the user's selection or a predetermined setting. Alternatively, the display unit 400 may simultaneously display two or more various kinds of images as the natural image 420.

Referring to FIG. 3 again, the display unit 400 may display the color adjustment user interface 430. The color adjustment user interface 430 may be a user interface for representing an adjustment degree of color of the display unit 400. Also, the color adjustment user interface 430 may be a user interface for representing how much color of the display unit 400 is adjusted in response to a user's color adjustment instruction.

In this case, the display unit 400 may move at least a portion of the color adjustment user interface 430 in response to the user's color adjustment instruction. For example, the color adjustment user interface 430 may include a scroll bar 431 and a color adjustment cursor 432. In this case, the display unit 400 may display the color adjustment cursor 432 such that the color adjustment cursor 432 overlaps the scroll bar 431. Also, the display unit 400 may move the color adjustment cursor 432 on the scroll bar 431 while the color adjustment cursor 432 overlaps the scroll bar 431. For example, the display unit 400 may move the color adjustment cursor 432 to the left where an indication 'R correction' is provided along a path via which the scroll bar 431 extends. Also, the display unit 400 may move the color adjustment cursor 432 to the right where an indication 'G correction' is provided along the path via which the scroll bar 431 extends.

Alternatively, even in the case where color of the display unit 400 is adjusted by the controller 300, the color adjustment user interface 430 may maintain a fixed shape. For example, the color adjustment user interface 430 may maintain a fixed shape even in the case where a color adjustment instruction is input by a user.

Before color adjustment starts, or in the case where an instruction that instructs not to adjust color is input by a user, the display unit 400 may allow the color adjustment cursor 432 to be positioned at the center of the scroll bar 431. After that, in the case where a color adjustment instruction that instructs to emphasize red color is input by a user to the display device 10, the display unit 400 may emphasize red color. In this case, the display unit 400 may represent how much color has been adjusted by moving the color adjustment cursor 432 to the left where an indication "R correction" is provided by a predetermined distance along the path via which the scroll bar 431 extends. By doing so, the display device 10 may provide a user of the display device 10 with an opportunity to recognize whether the color has been adjusted, and if so, to recognize to what extent color has been adjusted.

The display unit 400 may adjust the color of the display to an extent that is proportional to an extent that the color adjustment cursor 432 has been moved. For example, in the case where a color adjustment instructions instruct to reduce the emphasis of the red color by a small amount is input by a user to the display device 10, the display unit 400 may move the color adjustment cursor 432 relatively little in a direction in which the indication 'R correction' is provided. In the case where a color adjustment instruction that instructs to reduce the emphasis of the red color to a relatively high degree, the display unit 400 may move the color adjustment cursor 432 by a large amount in a direction in which the indication 'R correction' is provided. By doing so, the display device 10 may provide the user of the display device 10 with an opportunity via which the user may recognize how much the user has adjusted color.

Figure 6:
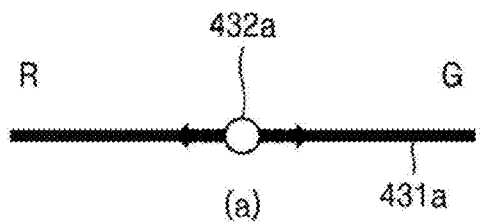
Figure 6:
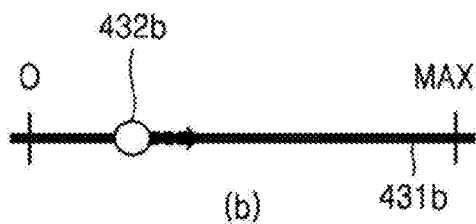
Figure 6:
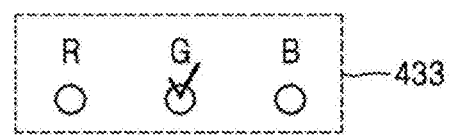
Figure 6:
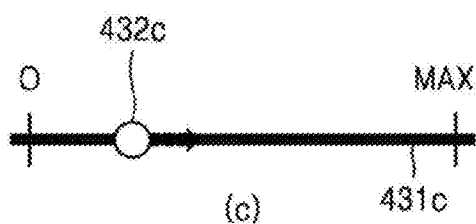
Figure 6:
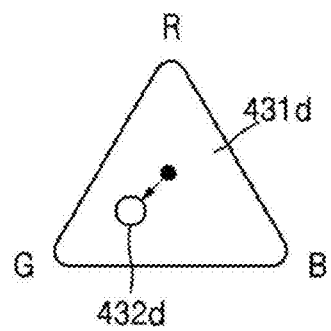
Figure 7:
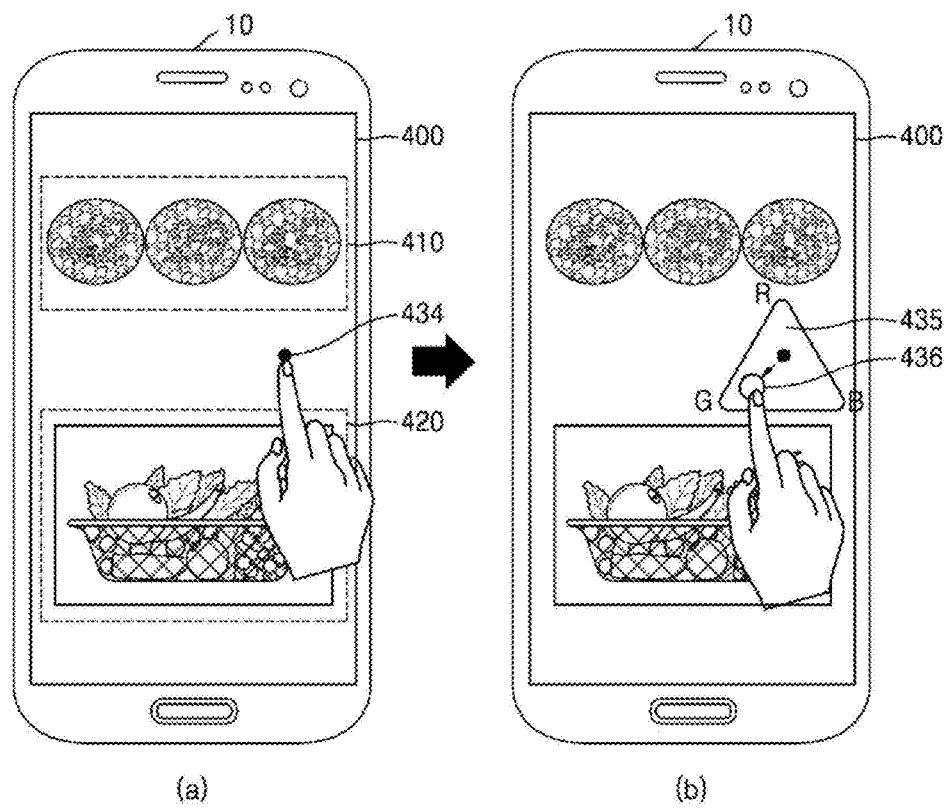

Meanwhile, in FIG. 3, the scroll bar 431 is illustrated as a segment extending left and right, the color adjustment cursor 432 is illustrated in a circular shape, and the indication 'R correction' and the indication 'G correction' are provided, but the specification is not limited thereto. For example, as shown in FIGS. 6 and 7, the color adjustment user interface 430 may be instantiated as various forms of user interfaces.

The color adjustment user interface 430 may be an image where a color adjustment cursor 432a overlaps a scroll bar 431a extending in one direction and an opposite direction as illustrated in FIG. 6A. In this case, the display unit 400 may move the color adjustment cursor 432a on the scroll bar 431a in one direction or the opposite direction in response to a user's color adjustment instruction.

Also, the color adjustment user interface 430 may be an image where a color adjustment cursor 432b overlaps a scroll bar 431b extending in one direction and the opposite direction as illustrated in FIG. 6B. However, in this case, the position of the color adjustment cursor 432b when color adjustment is not made may be the leftmost side of the scroll bar 431b. On the contrary, FIG. 3 illustrates that the central position of the scroll bar 431 represents the position of a state where color has not been corrected. For example, in the color adjustment user interface 430 illustrated in FIG. 3, when color adjustment is not made, the color adjustment cursor 432 may be positioned at the center of the scroll bar 431. However, in the color adjustment user interface 432b illustrated in FIG. 6B, when color adjustment is not made, the color adjustment cursor 432b may be positioned at the leftmost side or the rightmost side of the scroll bar 431a. Also, an exemplary embodiment of the present invention is not limited thereto and an arbitrary position among the left end region, the right end region, or the middle region of the scroll bar 431 of the color adjustment user interface 430 may represent a position of a state under which color has not been adjusted.

Also, as illustrated in FIG. 6C, the color adjustment user interface 430 may be an image where a color select user interface 433 for selecting color to adjust is additionally displayed in addition to an image where a color adjustment cursor 432c overlaps a scroll bar 431c extending in one direction and the opposite direction. The display unit 400 may display color which a user intends to adjust on the color select user interface 433. For example, in the case where a user inputs an instruction that instructs to adjust green among red, green, and blue to the display device 10, the display unit 400 may display a user interface in a 'V' shape at the lower end of a position at which an indication 'G' is provided to the color select user interface 433. By doing so, the display device 10 may provide a user with an opportunity via which the user may recognize color to be currently adjusted.

Also, the color adjustment user interface 430 may be an image where a color adjustment cursor 432d overlaps a scroll region 431d displayed in a two-dimensional geometrical shape as illustrated in FIG. 6D. In this case, when a user emphasizes at least one of red, green, and blue, the display unit 400 may move the color adjustment cursor 432d in a direction close to the relevant emphasized color on the scroll region 431d.

Also, the color adjustment user interface 430 may be an image generated when contact from a user is detected as illustrated in FIG. 7. For example, as illustrated in FIG. 7A, the display unit 400 may display the color vision deficiency test image 410 and the natural image 420. In this case, the input unit 200 of the display device 10 may detect a user's contact on the display unit 400. In this case, the display unit 400 may display an image 434 representing a fact that the user's contact has been detected at a detected position.

When the user's contact is detected, the display unit 400 may display the color adjustment user interface 430 around a position at which the user's contact is detected. For example, the display unit 400 may display a scroll region 435 around the position at which the user's contact is detected, and display a color adjustment cursor 436 that moves in response to the user's dragging operation after the contact. In this case, the display device 10 may adjust color displayed on the display unit 400 in response to the user's dragging operation.

The scroll bar 431 of the color adjustment user interface 430 may be a visual element extending in two or more arbitrary directions, and the color adjustment cursor 432 may be a circle, an ellipse, or a figure of various geometrical shapes.

Referring to FIG. 3 again, the display unit 400 may display the color vision deficiency test image 410, the natural image 420, and the color adjustment user interface 430 on one screen. Since the display unit 400 provides the natural image 420 together with the color vision deficiency test image 410, the display device 10 may provide a user with not only the simple test image but also an opportunity through which the user may see how objects that may be encountered in real life are displayed on the display device 10 after a color adjustment has been performed.

Although not shown, the display unit 400 might not simultaneously display the color vision deficiency test image 410 and the natural image 420 on one screen, and may sequentially display the color vision deficiency test image 410 and the natural image 420. For example, the display unit 400 may display the color vision deficiency test image 410 and a first color adjustment user interface. A user may recognize whether the user has a color vision deficiency for at least one color by using the color vision deficiency test image 410. For example, the user may recognize a fact that the user has red green color weakness. For example, the user may recognize a fact that the user has blue color weakness.

After that, the display unit 400 may display the natural image 420 and a second color adjustment user interface. In this case, the display unit 400 may display color which a user desires to adjust on the second color adjustment user interface based on the input received via the first color adjustment user interface. For example, in the case where the user inputs a fact that the user has red green color weakness via the first color adjustment user interface, the display unit 400 may allow red color and green color to be displayed on the second color adjustment user interface. After that, the display device 10 may adjust the red color and/or the green color in response to the user's color adjustment instruction. For another example, in the case where the user inputs a fact that the user has blue color weakness via the first color adjustment user interface, the display unit 400 may allow blue color to be displayed on the second color adjustment user interface. After that, the display device 10 may adjust blue color in response to the user's color adjustment instruction. By doing so, the display device 10 may divide an operation of adjusting color into two operations including an operation of determining whether the user has color vision deficiency and an operation of adjusting color depending on a degree to which the user has a color vision degree deficiency.

Also, the display unit 400 may replace at least one of the color vision deficiency test image 410 and the natural image 420 with a new image according to a predetermined probability whenever the display device 10 is driven. For example, the display unit 400 may display an Ishihara test image on which 42, 29, and 45 are written as the color vision deficiency test image 410 at a first moment. After that, the display unit 400 may display an Ishihara test image on which 10, 21, and 37 are written as the color vision deficiency test image 410, or display a color wheel at a second moment. For example, the display unit 400 may display a natural image where a plurality of fruits are displayed as the natural image 420 at a first moment. After that, the display unit 400 may display a traffic light image as the natural image 420 at a second moment.

In this case, the display unit 400 may always replace at least one of the color vision deficiency test image 410 and the natural image 420 whenever the display device 10 is newly driven, and replace at least one of the color vision deficiency test image 410 and the natural image 420 according to a predetermined probability whenever the display device 10 is newly driven. Through this operation, the display device 10 may determine whether a user has a color vision deficiency and, if so, to measure an extent to which the user has the color vision deficiency, without being influenced by the user's memory or habit by allowing the color vision deficiency test image 410 and the natural image 420 to be automatically replaced.

Also, in the case where the user inputs an image replace instruction to the display device 10, the display unit 400 may replace at least one of the color vision deficiency test image 410 and the natural image 420.

Figure 8:
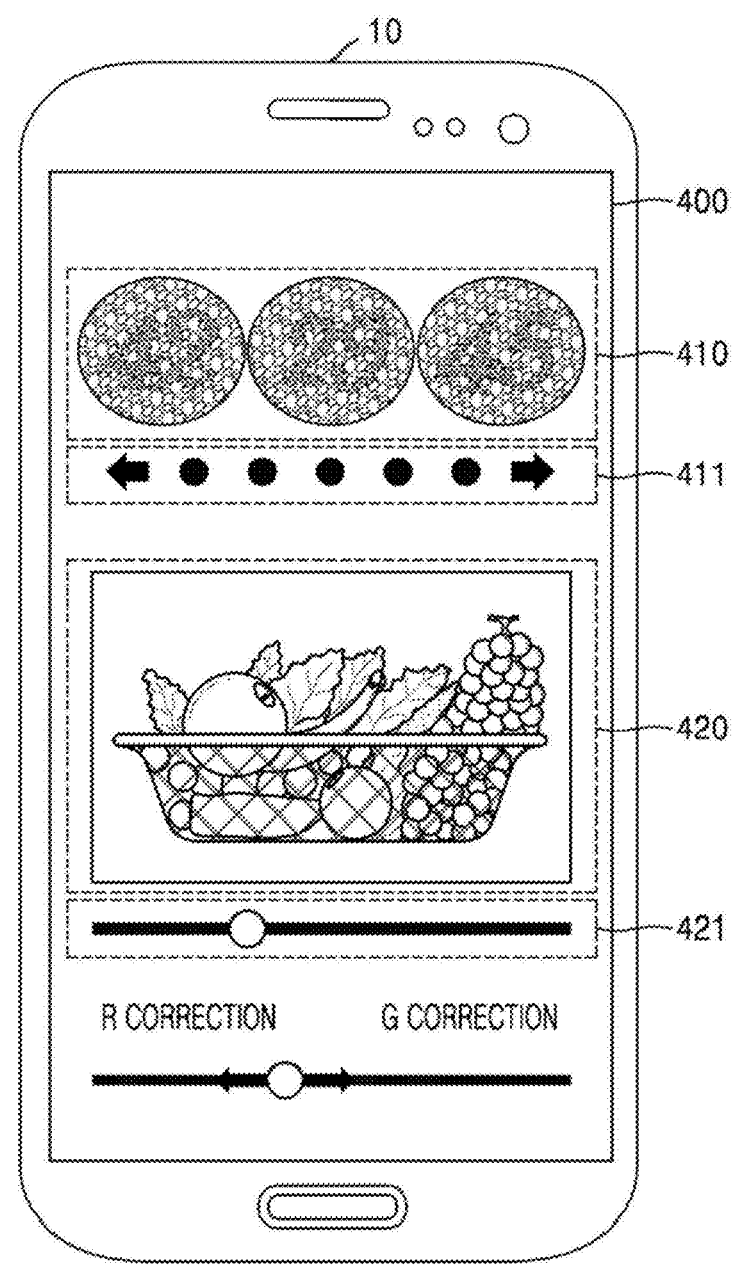

For example, referring to FIG. 8, the display unit 400 may display a first image replace user interface 411 for replacing the color vision deficiency test image 410 with another image, and a second image replace user interface 421 for replacing the natural image 420 with another image.

When the user selects an arrow of the first image replace user interface 411, the display unit 400 may replace the color vision deficiency test image 410 with an image corresponding to an arrow direction. Also, when the user selects a dot region of the first image replace user interface 411, the display unit 400 may replace the color vision deficiency test image 410 with an image corresponding to the relevant dot. Also, when the user moves an image replace cursor on the scroll bar of the second image replace user interface 421, the display unit 400 may replace the natural image 420 with an image corresponding to a position to which the relevant image replace cursor has been moved. Through this operation, the display device 10 allows the user to determine whether the user has color vision deficiency and a degree to which the user has the color vision deficiency by using a desired image by allowing the color vision deficiency test image 410 and the natural image 420 to be replaced according to the user's intention.

Figure 9:
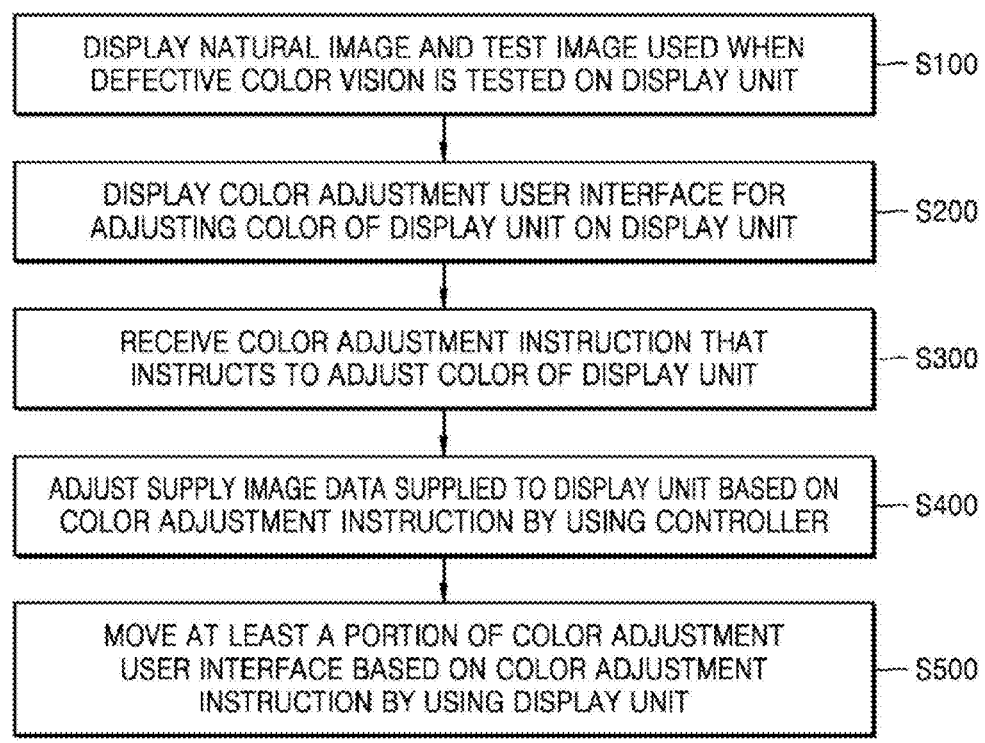
FIGS. 9 and 10 are schematic flowcharts illustrating a method of driving a display device according to an exemplary embodiment of the present invention.
Figure 10:
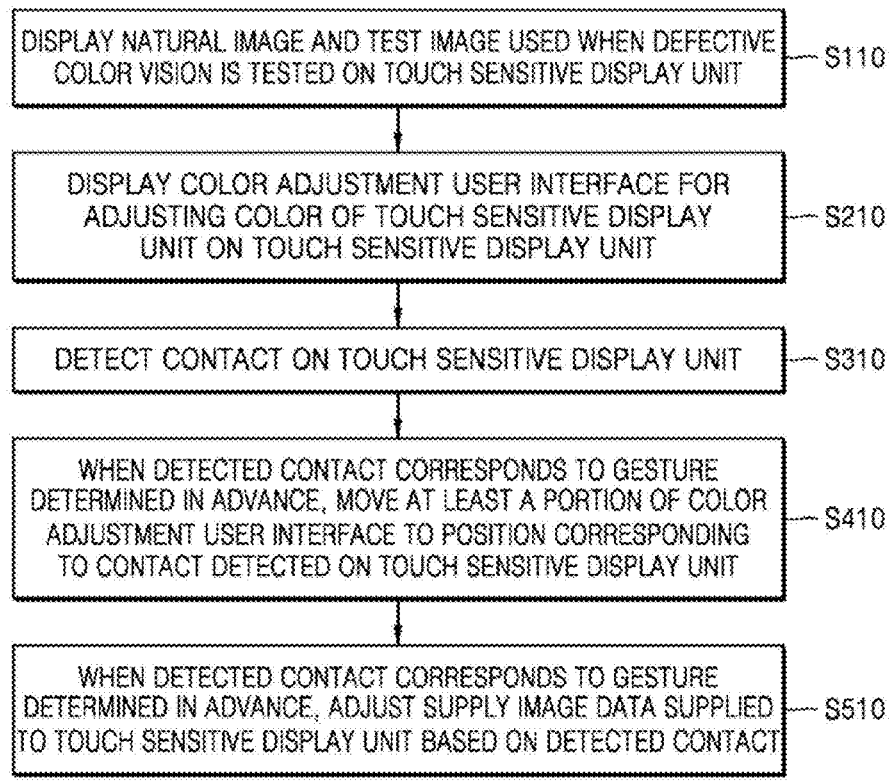

FIGS. 9 and 10 are schematic flowcharts illustrating a method of driving a display device according to an exemplary embodiment of the present invention.

The flowcharts illustrated in FIGS. 9 and 10 include operations processed in time series in the display device 10 of FIGS. 1 to 8. Therefore, though content is omitted in the description below, the content described in the foregoing, regarding the configurations illustrated in FIGS. 1 to 8 may be applied to the flowcharts illustrated in FIGS. 9 and 10.

Referring to FIG. 9, a method of driving the display device according to an exemplary embodiment of the present invention may include displaying (S100) a natural image and a color vision deficiency test image on the display unit, displaying (S200), on the display unit, the color adjustment user interface for adjusting color of the display unit, receiving (S300) a color adjustment instruction, to adjust color of the display unit, via the input unit, adjusting (S400) supply image data supplied to the display unit based on the color adjustment instruction by using the controller, and moving (S500) at least a portion of the color adjustment user interface based on the color adjustment instruction by using the display unit.

Also, referring to FIG. 10, a method of driving the display device according to an exemplary embodiment of the present invention may include displaying (S110) a natural image and a test image used when color vision deficiency is tested on the touch sensitive display unit, displaying (S210) the color adjustment user interface for adjusting color of the touch sensitive display unit on the touch sensitive display unit, detecting (S310) a contact on the touch sensitive display unit, when the detected contact corresponds to a gesture determined in advance, moving (S410) at least a portion of the color adjustment user interface to a position corresponding to the contact detected on the touch sensitive display unit, and when the detected contact corresponds to a gesture determined in advance, adjusting (S510) supply image data supplied to the touch sensitive display unit based on the detected contact.

According to the exemplary embodiments of the present invention described above, it is possible to provide a display device that allows users with color vision deficiencies to discriminate colors which would otherwise be difficult for the user to discriminate. Also, it is possible to provide a display device that provides not only an opportunity for correcting color so that users with color vision deficiencies may discriminate colors but also an opportunity for correcting color so that the users with color vision deficiencies may be able to appreciate images that they would not otherwise be able to fully appreciate.

The exemplary embodiments of the present invention described above may be implemented in the form of a computer program executable via various components on a computer, and the computer program may be recorded on a non-transitory computer-readable recording medium. In this case, examples of the non-transitory computer-readable recording medium include magnetic recording media such as hard disks, floppy disks, and magnetic tapes, optical recording media such as CD-ROMs and DVDs, magneto-optical recording media such as floptical disks, and hardware devices such as ROMs, RAMs, and flash memories that are especially configured to store and execute program commands.

While one or more exemplary embodiments of the present invention have been described with reference to the figures, it will be understood by those of ordinary skill in the art that various changes in form and details may be made therein without departing from the spirit and scope of the present disclosure.

What is claimed is:

1. A method of driving a display device comprising a display unit, the method comprising:
  displaying both a natural image and a color vision test image on the display unit, the color vision test image being an image used to determine whether a person has a color vision impairment;
  displaying, on the display unit, a color adjustment user interface for showing a degree to which color adjustment is implemented on the display unit;
  receiving a color adjustment instruction, via an input unit, to adjust the color of the display unit;
  adjusting the display of the natural image and the color vision test image based on the color, adjustment instructions as the color adjustment instructions are received; and
  adjusting supply image data supplied to the display unit based on the color adjustment instruction,
  wherein the natural image, the color vision test, and the color adjustment user interface are all displayed at a same time.

2. The method of claim 1, wherein the color adjustment instruction adjusts the color of the display unit from a first color scheme in which a user who has a color vision impairment is not able to effectively discriminate between color shades therein to a second color scheme in which the user who has the color vision impairment is able to effectively discriminate between color shades thereof, and wherein the color adjustment instruction is provided by the user who has a color vision impairment.

3. The method of claim 1, further comprising: after receiving the color adjustment instruction, moving at least a portion of the color adjustment user interface based on the color adjustment instruction.

4. The method of claim 1, further comprising, after the displaying of the natural and color vision test images:
   receiving an image switching instruction to switch at least one of the natural image and the color vision test image to another image; and
   switching the at least one of the natural image and the color vision test image to the another image based on the image switching instruction,
   wherein the displaying of the images comprises displaying at least one image switching user interface at a position of the display unit corresponding to the at least one of the natural image and the color vision test image.

5. The method of claim 1, further comprising: receiving input image data from an external source via a communication unit, wherein the adjusting comprises adjusting the input image data based on the color adjustment instruction to generate the supply image data.

6. The method of claim 1, wherein the adjusting comprises: selecting one gray scale curve, among a plurality of gray scale curves, based on the color adjustment instruction, determining a data signal corresponding to the supply image data based on the selected gray scale curve, and supplying the determined data signal to a light-emitting device included in the display unit.

7. The method of claim 1, wherein the color adjustment user interface comprises a color adjustment cursor, and the color adjustment cursor is moved based on the color adjustment instruction.

8. The method of claim 7, wherein the adjusting of the supply image data comprises adjusting a correction degree of the supply image data in proportion to a distance by which the color adjustment cursor is moved from an initial position to a moved position.

9. The method of claim 1, wherein the displaying of the natural and color vision test images comprises: replacing the at least one of the natural image and the color vision test image with a new image according to a predetermined probability or a user's image replace instruction whenever the display device is activated.

10. The method of claim 1, wherein the displaying of the natural and color vision test images comprises:
   a first image display operation displaying the color vision test image; and
   a second image display operation displaying the natural image, and
   the displaying of the color adjustment user interface comprises:
   a first interface display operation of, when the color vision test image is displayed, displaying a user interface for testing whether the user has a color vision impairment or for testing what type of color vision impairment the user has; and
   a second interface display operation of, when the natural image is displayed, displaying the color adjustment user interface.

11. The method of claim 10, wherein the second interface display operation comprises determining a kind of color to display on the color adjustment user interface based on a kind of color vision impairment the user is determined to have in the first interface display operation, and the adjusting comprises determining a kind of color to adjust according to the color adjustment instruction based on the kind of the color vision impairment the user is determined to have in the first interface display operation.

12. The method of claim 1, wherein the color vision test image comprises at least one of an Ishihara test plate image, a color wheel where predetermined color or arbitrary colors are arranged, a color code where predetermined color or arbitrary colors are arranged, and a mosaic pattern image where predetermined color or arbitrary colors are arranged.

13. A method implemented by a display device comprising a touch sensitive display unit, the method comprising:
   displaying a natural image and a color vision test image on the touch sensitive display unit, the color vision test image being an image used to determine whether a person has a color vision impairment;
   displaying, on the touch sensitive display unit, a color adjustment user interface for representing a degree to which color adjustment is implemented on the touch sensitive display unit;
   detecting a contact on the touch sensitive display unit;
   determining whether the detected contact corresponds to a predefined gesture; and
   when it is determined that the detected contact corresponds to the predefined gesture, adjusting the display of the natural image, the display of the color vision test image, and display of supply image data supplied to the touch sensitive display unit based on the detected contact,
   wherein the displaying of the natural and color vision test images comprises: simultaneously displaying the natural image and the color vision test image on one screen, and the displaying of the color adjustment user interface comprises: displaying the color adjustment user interface on the one screen together with the natural image and the color vision test image.

14. The method of claim 13, further comprising: receiving input image data from an external source via a communication unit included in the display device, wherein the adjusting comprises adjusting red, green, blue (RGB) values of the input image data based on the detected contact to generate corrected RGB values, and generating the supply image data by using the corrected RGB values as components.

15. The method of claim 13, wherein the color adjustment user interface comprises a color adjustment cursor, and the color adjustment cursor is moved based on the detected contact, and the adjusting of the supply image data comprises adjusting a correction degree of the supply image data in proportion to a distance by which the color adjustment cursor is moved from an initial position to a moved position.

16. The method of claim 13, wherein the displaying of the natural and color vision test images comprises: replacing at least one of the natural image and the color vision test image with a new image according to a predetermined probability or a user's image replace instruction whenever the display device is activated.

17. A display device comprising:
   a display unit for displaying a natural image, a test image for determining whether a person has a color vision impairment, and a color adjustment user interface for adjusting color;
   an input unit for receiving a color adjustment instruction to adjust color of the display unit; and
   a controller for adjusting the display of the natural image, the display of the color vision test image, and a display of supply image data supplied to the display unit based on the color adjustment instruction, all at the same time.

18. The display device of claim 17, wherein the input unit comprises at least one of a capacitance change sensor, a storage change sensor, and a light amount change sensor that detects a touch input, and the color adjustment instruction is a touch input for the input unit that corresponds to a predefined gesture.

* * * * *